(12) United States Patent
Leppänen et al.

(10) Patent No.: US 11,665,271 B2
(45) Date of Patent: May 30, 2023

(54) CONTROLLING AUDIO OUTPUT

(71) Applicant: Nokia Technologies Oy, Espoo (FI)

(72) Inventors: Jussi Artturi Leppänen, Tampere (FI); Lasse Juhani Laaksonen, Tampere (FI); Arto Juhani Lehtiniemi, Lempäälä (FI); Miikka Tapani Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 15 days.

(21) Appl. No.: 17/196,099

(22) Filed: Mar. 9, 2021

(65) Prior Publication Data

US 2021/0306448 A1 Sep. 30, 2021

(30) Foreign Application Priority Data

Mar. 25, 2020 (EP) .................................... 20165511

(51) Int. Cl.
*H04M 1/60* (2006.01)
*G06F 3/01* (2006.01)
*H04R 1/10* (2006.01)
*H04R 5/033* (2006.01)
*H04R 5/04* (2006.01)
*H04S 1/00* (2006.01)
*H04S 7/00* (2006.01)

(52) U.S. Cl.
CPC .......... *H04M 1/6066* (2013.01); *G06F 3/017* (2013.01); *H04R 1/1041* (2013.01); *H04R 5/033* (2013.01);
(Continued)

(58) Field of Classification Search
CPC .... H04M 1/6066; G06F 3/017; H04R 1/1041; H04R 5/033; H04R 5/04; H04R 2420/03;
(Continued)

(56) References Cited

U.S. PATENT DOCUMENTS 10,264,345 B1 4/2019 Sapozhnykov et al.
2010/0215170 A1 8/2010 Kannappan
(Continued)

FOREIGN PATENT DOCUMENTS

CN 102316394 A 1/2012
EP 3502835 A1 6/2019
(Continued)

OTHER PUBLICATIONS

"IVAS Usage Scenarios (IVAS-9)", 3GPP TSG-SA4#107 meeting, Tdoc S4 (20)0306, Agenda : 7.5, Editor, Jan. 20-24, 2020, pp. 1-11.
(Continued)

*Primary Examiner* — Eugene Yun
(74) *Attorney, Agent, or Firm* — Alston & Bird LLP

(57) ABSTRACT

This specification describes an apparatus for controlling audio output. The apparatus provides first and a second audio components for output to first and second audio transducers of a wearable device, determine a proximity between the wearable device and a third audio transducer and determining a first or second state of the first and second audio transducers, and controlling output of at least one of the first and second audio components based on the determined proximity and the state of the first and second transducers. Responsive the proximity being under a threshold and the state of the first transducer being in a first state whilst the second transducer is in a second state, the apparatus causes output of the audio component associated with the second state transducer to be transferred to the third audio transducer whilst continuing to output the audio component associated with the first state transducer to said transducer.

20 Claims, 8 Drawing Sheets

(52) U.S. Cl.
CPC .............. *H04R 5/04* (2013.01); *H04S 1/005* (2013.01); *H04S 1/007* (2013.01); *H04S 7/304* (2013.01)

(58) Field of Classification Search
CPC .......... H04S 1/005; H04S 1/007; H04S 7/304; H04S 7/308
USPC ...................................................... 455/569.1
See application file for complete search history.

(56) References Cited

U.S. PATENT DOCUMENTS

| | | |
|---|---|---|
| 2012/0244812 A1 | 9/2012 | Rosener |
| 2012/0310391 A1 | 12/2012 | Sanders |
| 2014/0170979 A1* | 6/2014 | Samanta Singhar ... G10L 25/60 455/41.2 |
| 2015/0195642 A1* | 7/2015 | Saideh ................. H04R 1/1033 381/74 |
| 2015/0256926 A1 | 9/2015 | Kim et al. |

FOREIGN PATENT DOCUMENTS

| | | |
|---|---|---|
| TW | 201820313 A | 6/2018 |
| WO | 2021/023505 A1 | 2/2021 |

OTHER PUBLICATIONS

Extended European Search Report received for corresponding European Patent Application No. 20165511.5, dated Sep. 8, 2020, 9 pages.

\* cited by examiner

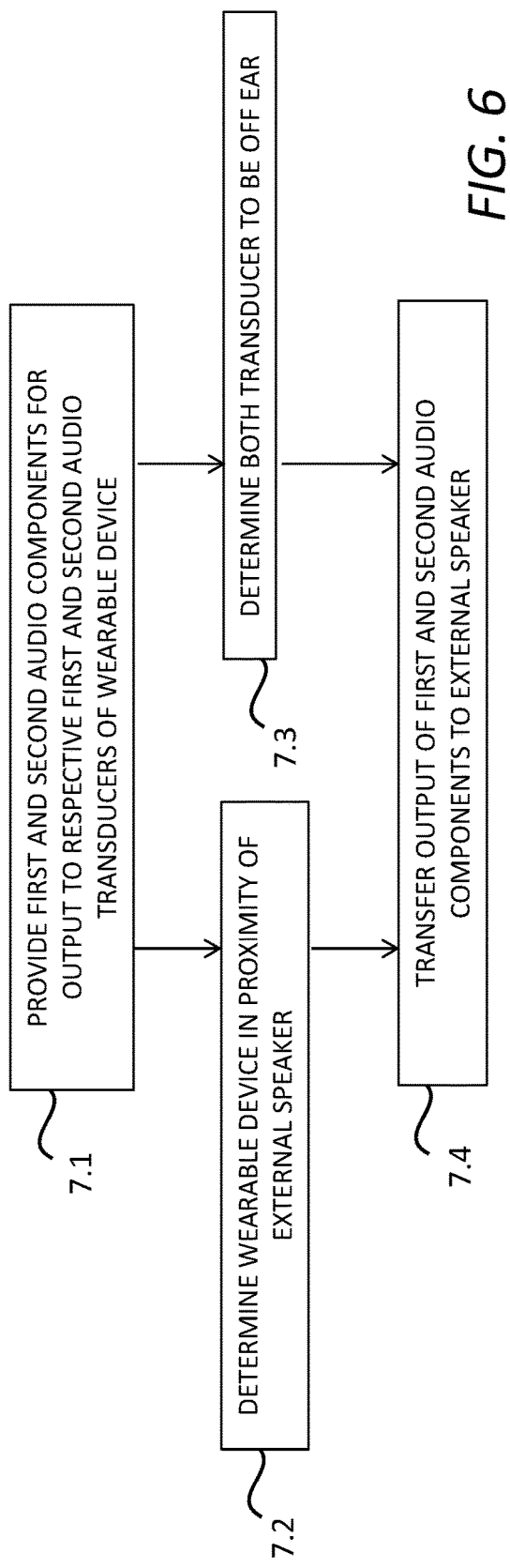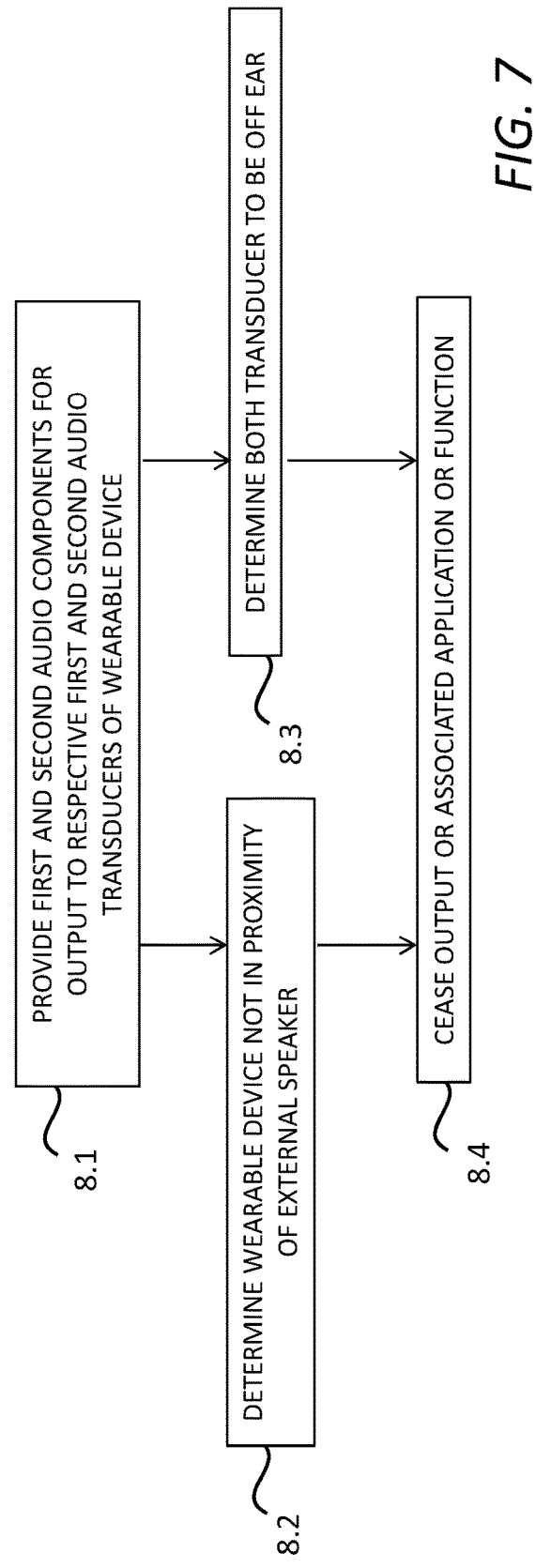

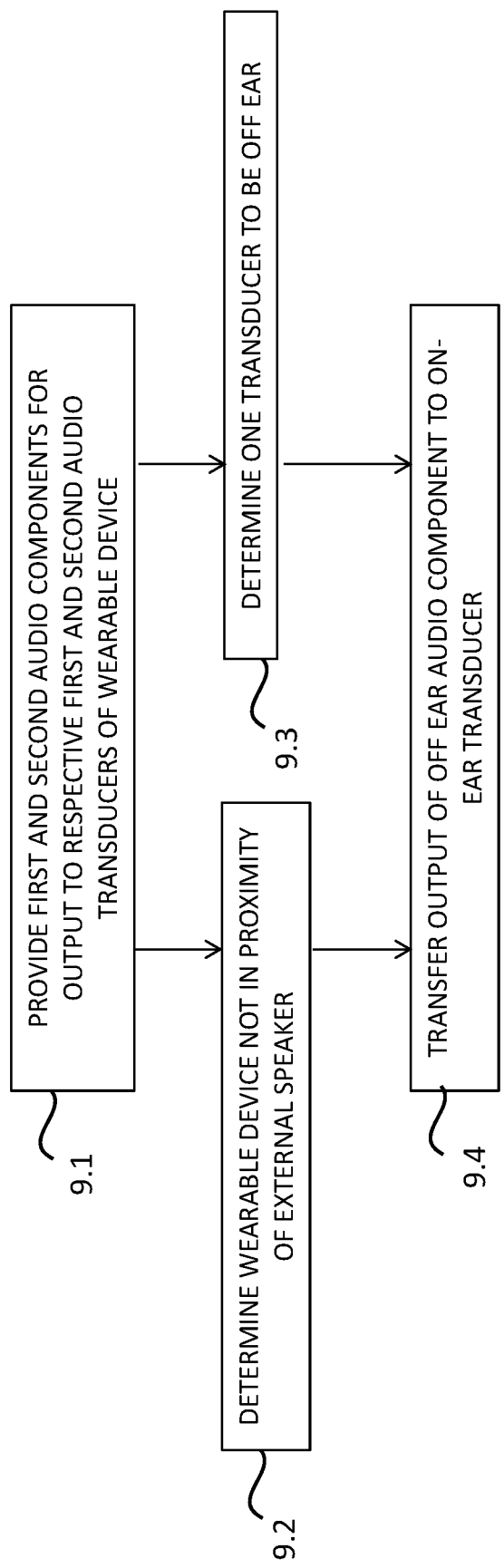

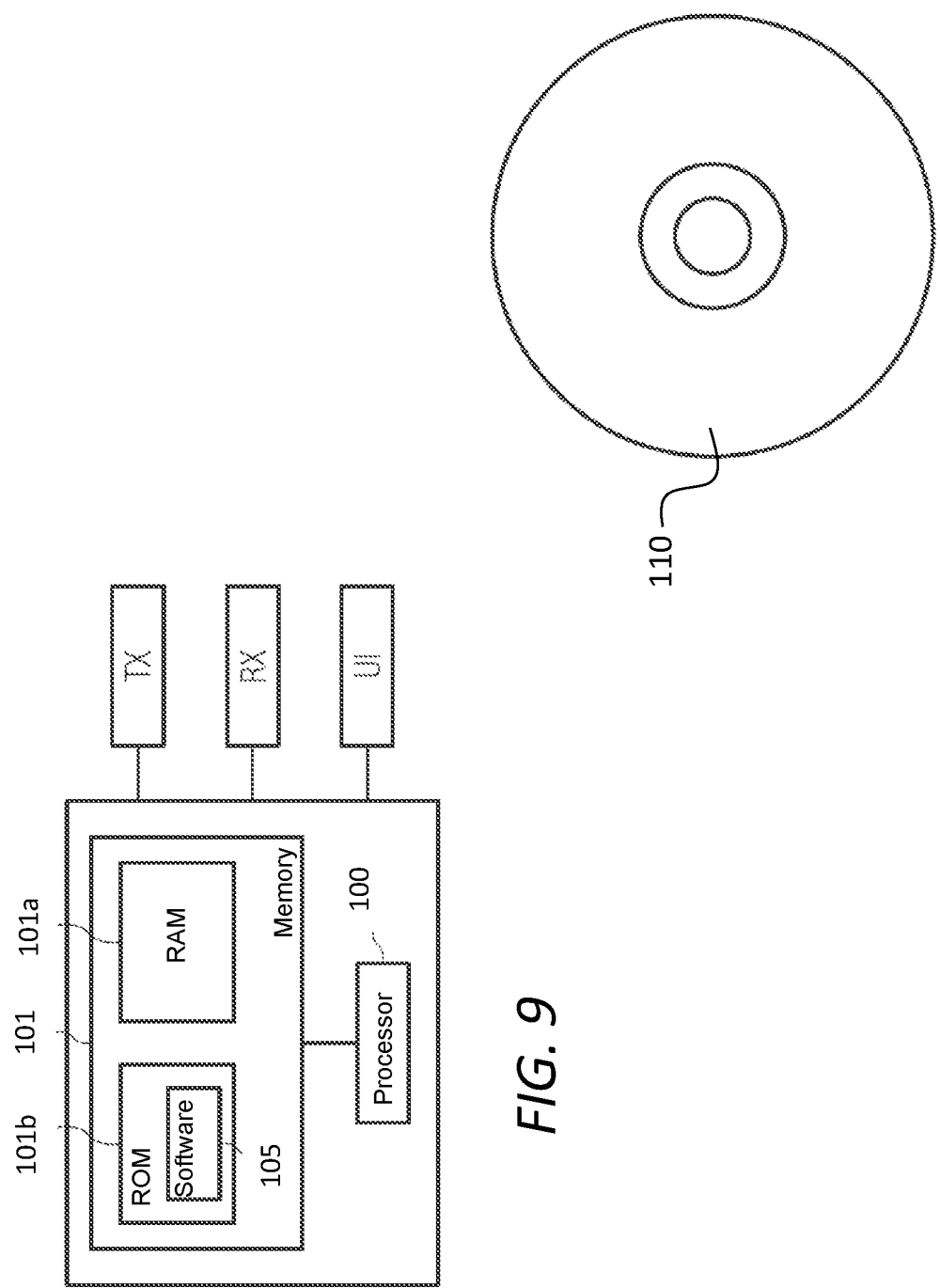

CONTROLLING AUDIO OUTPUT

FIELD

Example embodiments relate to apparatuses, methods and computer programs for controlling audio output, for example, in relation to a wearable audio output device.

BACKGROUND

Wearable devices are known, including devices for producing audio output. An example device comprises at least two audio transducers, such as a pair of earbuds or headphones, for outputting audio data as sound waves. The audio data itself may be received from a user device, such as a smartphone or media player. The user device may store the audio data locally or may receive and forward it from a streaming service. The audio data may comprise multiple audio components. In this respect, an audio component may refer to a set or subset of audio data that is distinct and separable from one or more other audio components. For example, in data representing stereo sound, there are two separate channels that can be played separately to two different transducers, e.g. the left and right earbuds. For example, data representing spatial sound may comprise data representing plural audio objects, each having associated position data representing where in the sound field the respective object is to be perceived. Spatial sound data may also comprise an ambience component representing background sounds. For example, data representing sound from a first application or service on a user device e.g. a voice call, may be a first audio component and ambience sounds may comprise another component.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: providing first and a second audio components for output to first and second audio transducers of a wearable device; determining a proximity between the apparatus or wearable device and a third audio transducer external to the wearable device; determining a first or second state of the first and second audio transducers; and controlling output of at least one of the first and second audio components based on the determined proximity and the state of the first and second transducers, wherein, responsive to the apparatus or wearable device being determined as proximate the third audio transducer, and the state of one of said first and second transducers being in a second state whilst the other of said first and second transducers is in a first state, the means for controlling output is configured to cause output of the audio component associated with the second state transducer to be transferred to the third audio transducer whilst continuing to output the audio component associated with the first state transducer to said transducer.

The first and second audio transducers may respectively comprise first and second earphones and wherein the means for determining the first or second state of said first and second audio transducers may be configured to determine either an on-ear state as the first state or an off-ear state as the second state for the first and second earphones.

The means for determining the first or second state of said first and second audio transducers may be configured to determine a respective battery charge level associated with each of the first and second transducers, wherein a battery charge level at or above a predetermined threshold corresponds to the first state and a battery charge level below the predetermined threshold corresponds to the second state.

Responsive to the determined proximity of the apparatus or wearable device crossing a proximity threshold value from being proximate the third audio transducer to not being proximate, the apparatus may be further configured to issue an audible notification to the first state transducer.

The apparatus may further comprise means for, subsequent to issuing the audible notification, receiving a user input or gesture for enabling output of the audio component that was being output to the third audio transducer to be transferred to the first state transducer.

The apparatus may further comprise means for determining that the third audio transducer supports stereo or spatial audio output, and wherein, if a third audio component is provided to the second state audio transducer for output with the respective first or second audio component in a spatialized form, the means for controlling output may be configured to transfer said spatialized audio components for stereo or spatial output at the third audio transducer.

The apparatus may further comprise means for determining that the apparatus or wearable device is proximate to a fourth audio transducer, different from the third audio transducer, external to the wearable device and that the current first state transducer has changed to the second state, and responsive to said determination, the means for controlling output may be configured to transfer to the corresponding audio component to said fourth audio transducer.

Responsive to the apparatus or wearable device being determined as proximate the third audio transducer, and both of said first and second transducers being in the second state, the means for controlling output may be configured to cause output of both the first and second audio components to be transferred to the third audio transducer.

Responsive to the apparatus or wearable device being determined as not being proximate the third audio transducer, and the state of one of said first and second transducers is in the second state whilst the other of said first and second transducers is in the first state, the means for controlling output may be configured to cause the audio component associated with the second state transducer to be transferred to the other, first state transducer with the current output of said first state transducer.

The means for controlling output may be further configured to generate a monaural mix of the first and second audio components for output to said first state transducer.

One of the audio components may correspond to a voice call or communications session.

Responsive to the apparatus or wearable device being determined as not proximate the third audio transducer, and the state of both of said first and second transducers being in the second state, the means for causing output may be configured to terminate the voice call or communications session.

The means for determining the proximity of the apparatus or wearable device to the third audio transducer may comprise determining receipt of an audible test signal issued by the third audio transducer using a microphone associated with the wearable device.

The apparatus may be a mobile telecommunications apparatus.

According to a second aspect, this specification describes a method, comprising: providing first and a second audio components for output to respective first and second audio transducers of a wearable device; determining a proximity between the apparatus or wearable device and a third audio transducer external to the wearable device; determining a first or second state of the first and second audio transducers; and controlling output of at least one of the first and second audio components based on the determined proximity and the state of the first and second transducers, wherein, responsive to the apparatus or wearable device being determined as proximate the third audio transducer, and the state of one of said first and second transducers being in a second state whilst the other of said first and second transducers is in the first state, causing output of the audio component associated with the second state transducer to be transferred to the third audio transducer whilst continuing to output the audio component associated with the first state transducer to said transducer.

The first and second audio transducers may respectively comprise first and second earphones and wherein determining the first or second state of said first and second audio transducers may determine either an on-ear state as the first state or an off-ear state as the second state for the first and second earphones.

Determining the first or second state of said first and second audio transducers may determine a respective battery charge level associated with each of the first and second transducers, wherein a battery charge level at or above a predetermined threshold corresponds to the first state and a battery charge level below the predetermined threshold corresponds to the second state.

Responsive to the determined proximity of the apparatus or wearable device crossing a proximity threshold value from being proximate the third audio transducer to not being proximate, an audible notification may be issued to the first state transducer.

Subsequent to issuing the audible notification, the method may further comprise receiving a user input or gesture for enabling output of the audio component that was being output to the third audio transducer to be transferred to the first state transducer.

The method may further comprise determining that the third audio transducer supports stereo or spatial audio output, and wherein, if a third audio component is provided to the second state audio transducer for output with the respective first or second audio component in a spatialized form, controlling output may comprise transferring said spatialized audio components for stereo or spatial output at the third audio transducer.

The method may further comprise determining that the apparatus or wearable device is proximate to a fourth audio transducer, different from the third audio transducer, external to the wearable device and that the current first state transducer has changed to the second state, and responsive to said determination, controlling output may transfer the corresponding audio component to said fourth audio transducer.

Responsive to the apparatus or wearable device being determined as proximate the third audio transducer, and both of said first and second transducers being in the second state, controlling output may cause output of both the first and second audio components to be transferred to the third audio transducer.

Responsive to the apparatus or wearable device being determined as not being proximate the third audio transducer, and the state of one of said first and second transducers is in the second state whilst the other of said first and second transducers is in the first state, controlling output may comprise causing the audio component associated with the second state transducer to be transferred to the other, first state transducer with the current output of said first state transducer.

Controlling output may generate a monaural mix of the first and second audio components for output to said first state transducer.

One of the audio components may correspond to a voice call or communications session.

Responsive to the apparatus or wearable device being determined as not proximate the third audio transducer, and the state of both of said first and second transducers being in the second state, causing output may terminate the voice call or communications session.

Determining the proximity of the apparatus or wearable device to the third audio transducer may comprise determining receipt of an audible test signal issued by the third audio transducer using a microphone associated with the wearable device.

The method may be performed by a mobile telecommunications apparatus.

According to a third aspect, this specification describes a computer program comprising instructions for causing an apparatus to perform at least the following: providing first and a second audio components for output to respective first and second audio transducers of a wearable device; determining a proximity between the apparatus or wearable device and a third audio transducer external to the wearable device; determining a first or second state of the first and second audio transducers; and controlling output of at least one of the first and second audio components based on the determined proximity and the state of the first and second transducers, wherein, responsive to the apparatus or wearable device being determined as proximate the third audio transducer, and the state of one of said first and second transducers being in a second state whilst the other of said first and second transducers is in the first state, causing output of the audio component associated with the second state transducer to be transferred to the third audio transducer whilst continuing to output the audio component associated with the first state transducer to said transducer. Example embodiments may also provide any feature of the second aspect.

According to a fourth aspect, this specification describes a computer-readable medium (such as a non-transitory computer-readable medium) comprising program instructions stored thereon for performing at least the following: providing first and a second audio components for output to respective first and second audio transducers of a wearable device; determining a proximity between the apparatus or wearable device and a third audio transducer external to the wearable device; determining a first or second state of the first and second audio transducers; and controlling output of at least one of the first and second audio components based on the determined proximity and the state of the first and second transducers, wherein, responsive to the apparatus or wearable device being determined as proximate the third audio transducer, and the state of one of said first and second transducers being in a second state whilst the other of said first and second transducers is in the first state, causing output of the audio component associated with the second state transducer to be transferred to the third audio transducer whilst continuing to output the audio component associated with the first state transducer to said transducer. Example embodiments may also provide any feature of the second aspect.

According to a fifth aspect, this specification describes an apparatus comprising: at least one processor; and at least one memory including computer program code which, when executed by the at least one processor, causes the apparatus to: provide first and a second audio components for output to respective first and second audio transducers of a wearable device; determine a proximity between the apparatus or wearable device and a third audio transducer external to the wearable device; determine a first or second state of the first and second audio transducers; and control output of at least one of the first and second audio components based on the determined proximity and the state of the first and second transducers, wherein, responsive to the apparatus or wearable device being determined as proximate the third audio transducer, and the state of one of said first and second transducers being in a second state whilst the other of said first and second transducers is in the first state, causing output of the audio component associated with the second state transducer to be transferred to the third audio transducer whilst continuing to output the audio component associated with the first state transducer to said transducer. Example embodiments may also provide any feature of the second aspect.

BRIEF DESCRIPTION OF DRAWINGS

Example embodiments will now be described, by way of non-limiting example, with reference to the accompanying drawings, in which:

FIG. 6 is a flow diagram showing other specific processing operations that may be performed in some example embodiments;

FIG. 7 is a flow diagram showing other specific processing operations that may be performed in some example embodiments;

FIG. 8 is a flow diagram showing other specific processing operations that may be performed in some example embodiments;

FIG. 9 is a schematic block diagram of a user apparatus according to some example embodiments; and FIG. 10 is a plan view of a non-transitory computer-readable medium as an example carrier of computer-readable code which, when executed, may perform processing operations according to some example embodiments.

DETAILED DESCRIPTION

Figure 1:
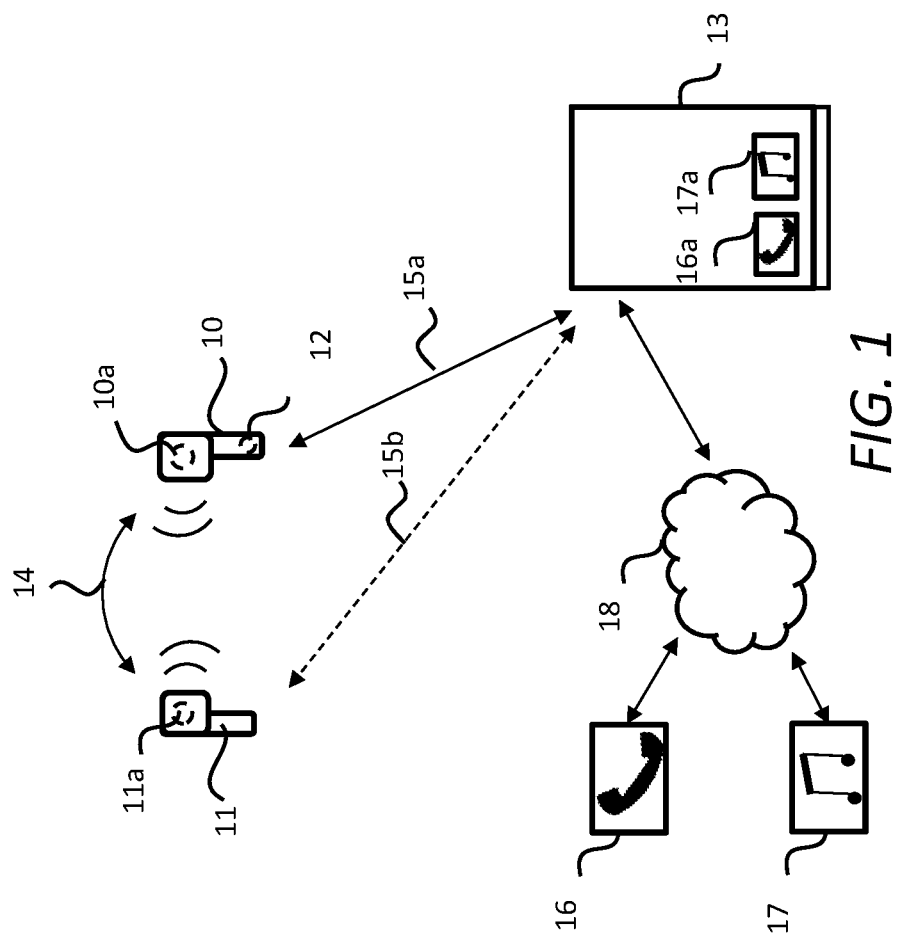
FIG. 1 is a schematic diagram of a network comprising a user apparatus according to some example embodiments in communication with a wearable audio device.

Example embodiments may relate to the control of audio output in relation to audio data comprising a plurality of audio components.

An audio component may refer to a set or subset of audio data that is distinct and separable from one or more other audio components. For example, in data representing stereo sound, there are two separate channels that can be played separately to two different transducers, e.g. left and right earbuds. For example, data representing spatial sound may comprise data representing plural audio objects, each having associated spatial data representing where in the sound field the respective object is to be perceived. Spatial sound data may also comprise an ambience component representing background sound. For example, data representing sound from a first application or service on a user device e.g. a voice call, may be distinct from data representing sound from a different application, e.g. a music player or messaging application. For example, 5.1 surround sound comprises six channels, five being "full bandwidth" channels and one being a low-frequency "bass" channel. Each may be considered an individual audio component.

Example embodiments may relate to control of how such multi-component audio data is processed and/or provided for output, e.g. to which of first and second transducers, or to another transducer, and under what conditions. For example, the control may be determined based on the determined proximity of a user device (hereafter "apparatus") or an associated wearable device having at least first and second transducers, to a third transducer which is external to said wearable device. The control may also be determined based on the state of the first and second transducers of the wearable device.

A wearable device may be considered any device configured to be carried or worn by a user and capable of producing sound via first and second transducers thereon. In some cases, a wearable device may be battery-powered and/or in wireless communication with the apparatus configured to provide the audio data. For example, the wearable device may be in communication with the apparatus using a wireless protocol such as WiFi, Bluetooth, and/or Zigbee. The wearable device may comprise, for example, at least a pair of transducers, and may comprise earphones, which may be considered a generic term covering earbuds, clip-on earphones, headphones or speakers of a headset (e.g. a virtual reality headset). The transducers convert electrical signals to audible sound waves. In use, the first and second transducers are usually respectively placed adjacent to a user's ears or partially inserted within the user's ear canals.

The apparatus may comprise any processing device capable of providing audio data to the wearable device, for example, but not limited to, a smartphone, digital assistant, digital music player, personal computer, laptop, tablet computer or smartwatch. The apparatus may also comprise one or more decoders for decoding the audio data into a format appropriate for output by the transducers. The apparatus may also comprise one or more memory modules for storing the audio data, although, in some embodiments, the apparatus may be configured to receive streaming audio data from a remote source, e.g. via the cloud, and hence may only temporarily store the audio data. The apparatus may be capable of establishing a communication session with a third party via a network, e.g. an audio or videoconference or a voice call. As such, the apparatus may be configured to transmit and receive data using protocols for 3G, 4G, LTE, 5G or any future generation communication protocol. The apparatus may comprise means for short-range communications using, for example, WiFi, Bluetooth, and/or Zigbee. The apparatus may comprise a display screen and one or more control buttons. The display screen may be touchsensitive. The apparatus may comprise one or more antennas for communicating with external devices.

The third transducer may comprise a speaker or the like, for example a smart speaker which can receive data from, and possibly transmit data to, the apparatus using a wired or wireless protocol such as WiFi, Bluetooth, Zigbee and so on. For example, the third transducer may be a smart speaker that is connected to a home network. The third transducer may not be a wearable device in the sense that it is not designed to be usually carried or worn by a user and may be configured for non-personal output in the sense that anyone within audible range of said third transducer will be able to hear its output audio.

Purely for ease of explanation, it will be assumed hereafter that the wearable device is a pair of earbuds, the apparatus with which it communicates is a smartphone, and the third transducer is part of a smart speaker connected or connectable to the smartphone using conventional "pairing" techniques or the like. However, from the above paragraphs, it will be appreciated that variations in each of these components may be employed.

The state of the first and second transducers may comprise any detectable state, for example first and second states relating to whether the respective transducer in an on-ear or off-ear state, i.e. a determination of whether an individual transducer is being worn or is removed from a user's ear, i.e. from its in-use position. Another example of "state" in this context may include whether the transducers have low or no power, e.g. based on remaining battery charge. For example, a first state may comprise a particular transducer having a battery level that is at or above a threshold, and a second state may comprise a particular transducer having a battery level below the threshold. There are a number of ways in which this can be achieved, for example using one or more of a proximity sensor associated with each transducer, e.g. in the body of the earbud, an orientation sensor associated with each transducer and/or, as disclosed in US2019110120, using microphone signals from a plurality of microphones to derive a plurality of signal measure features which are processed and combined to produce an output indication of whether a transducer is within the ear of a user.

The proximity of the wearable device or the apparatus to the third transducer may be determined using, for example, one or more proximity sensors, positional data associated with the wearable device (or the apparatus) and the known or measured location of the third transducer, or a combination thereof. Positional data may be derived using a GPS or GNSS receiver, high-accuracy indoor positioning (HAIP) readers and/or one or more accelerometers and gyroscopes. Another method is for the third transducer to be configured to output a reference signal, e.g. a tone, which may be continuous or periodic, such as to be detectable through one or more microphones of the apparatus and/or the wearable device (e.g. using a microphone of one or more of the earbuds) when in audible range of said third transducer. Whichever method of proximity determination is used, the proximity range may be configured such that the wearer of the wearable device will be in audible range of the third transducer, and hence a range of between zero and ten metres is given as an approximate example but should not be considered limiting.

Referring to FIG. 1, an example network is shown comprising a pair of earbuds 10, 11 each having a respective audio transducer 10a, 11a within an ear insert portion, and a respective stem portion. At least one stem portion may comprise a microphone 12. Other modules may be comprised in one or both earbuds 10, 11, including a means to communicate with one another via, for example, Bluetooth or some other RF protocol, and/or with an apparatus 13. Said means may comprise one or more appropriate antennas and transmitter and/or receiver circuitry. In some examples, one of said earbuds 10, 11 may be a master unit that communicates with the apparatus 13 and relays signals with the other, slave earbud as indicated by the arrow 14. In other examples, each earbud 10, 11 may individually communicate with the apparatus 13 as indicated by the arrows 15a, 15b. One or more touch controls may be provided on one or both earbuds 10, 11, e.g. to effect playback, pausing, track skipping and so on.

The apparatus 13 may comprise a smartphone having a display and a means to communicate with at least one of the earbuds 10, 11 and also to other remote devices 16, 17 via a network 18. Said means may comprise one or more appropriate antennas and transmitter and/or receiver circuitry. For example, one remote device 16 may be a remote user telephone or smartphone that may communicate with the apparatus 13 over a cellular network or other voice or data network using 3G, 4G, LTE, 5G or any future generation communication protocol. For example, another remote device 17 may comprise a streaming audio or video service. The apparatus 13 may comprise applications or services 16a, 17a configured to utilise such functions, e g making a call, sending a message, initiating or joining a videoconference, accessing the internet, accessing the streaming audio or video service etc.

Figure 2:
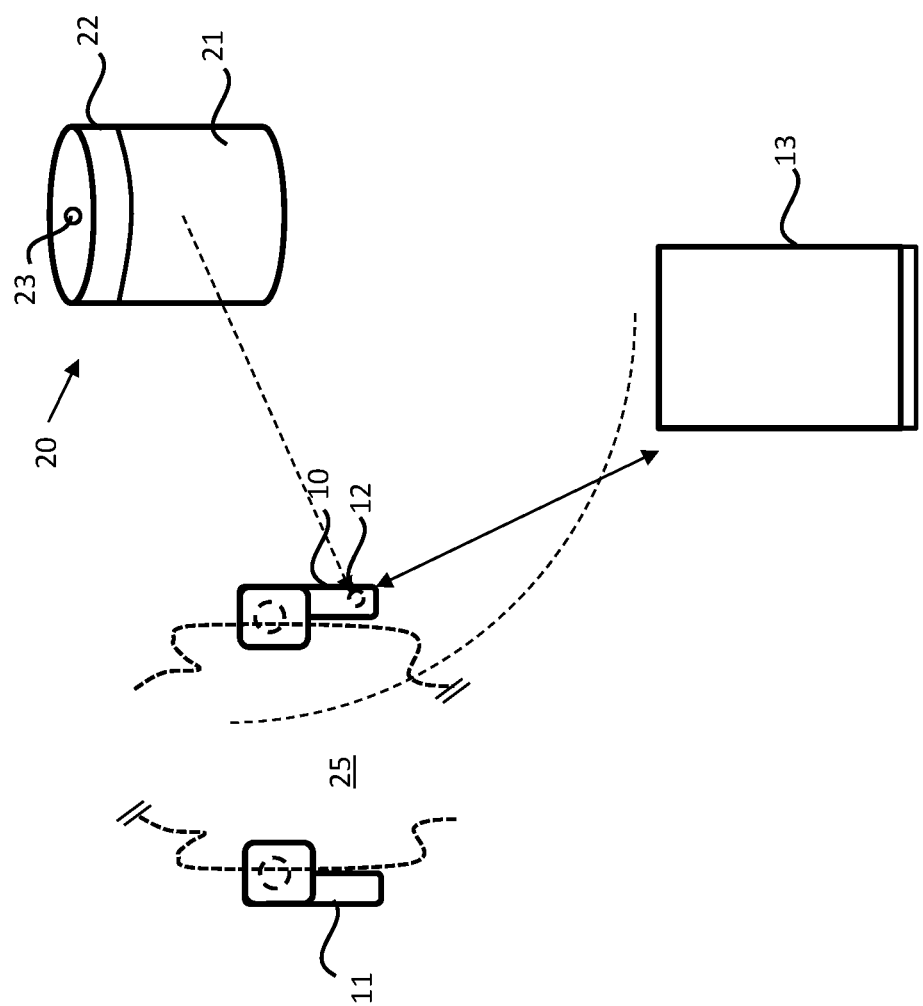
FIG. 2 is a schematic diagram of the FIG. 1 apparatus and the wearable audio device in proximity to an external smart speaker.

Referring to FIG. 2, the earbuds 10, 11 are represented in an on-ear state, i.e. when worn by a user 25. As already mentioned, it is known to determine or at least estimate when an earbud 10, 11 is on-ear or off-ear.

A smart speaker 20 is also shown, comprising at least a third transducer 21 (loudspeaker) and associated circuitry 22 which may decode and output monaural, stereo, surround sound and/or spatial sound. In some embodiments, there may be multiple third transducers spatially distributed within or around the smart speaker 20. The circuitry 22 may include one or more transmitters and/or receivers for communicating with the apparatus 13 directly or via a network, e.g. using WiFi, Bluetooth or Zigbee. The circuitry 22 may comprise one or more appropriate antennas. One or more control buttons may be provided. A microphone 23 may also be provided, for example to permit voice control or interaction with digital assistant functionality via the Internet.

In some situations, the user 25, when wearing the earbuds 10, 11, may be in proximity to the smart speaker 20 and in other situations, the user will not be in proximity "In proximity" may mean that a determination is made that the user is likely to hear audio output from the third transducer 21, which can be established by, for example, causing said third transducer 21 to output a test or reference signal that can be detected by the microphone 12 of the first earbud 10, or alternatively or additionally, by a microphone of the apparatus 13. The test or reference signal may be audible and therefore detectable only when the first earbud 10 or apparatus 13 is within hearing range of the smart speaker 20. Other methods of proximity may be employed, such as by using Bluetooth or other positioning methods. Note that a determination of proximity may involve determining a binary condition, for example whether the apparatus 13 or earbuds 10, 11 is or are within a predetermined distance threshold of the smart speaker 20 (in-proximity) or are outside that distance threshold (not in-proximity). FIG. 2 indicates an in-proximity state, whereby the first earbud 10 is within audible receiving range of a test tone issued by the third transducer 21 of the smart speaker 20; particularly, the microphone 12 receives the test tone and sends a signal to the apparatus 13 which may perform processing operations described herein, i.e. in response to the determination of proximity. In this example, the characteristics, e.g. volume and/or frequency of the test tone, may determine a distance threshold for determination of proximity.

Whether or not the user (via the earbuds 10, 11 and/or the apparatus 13) is or is not in proximity may be used to control how audio from the apparatus is controlled. Furthermore, the states of individual or both earbuds 10, 11 may contribute to the control.

To give some basic examples of said control, consider a user of said apparatus 13 and earbuds 10, 11 is participating in an immersive call with a friend. The user hears audio (the friend's voice as an audio object, i.e. a first audio component, and spatial ambience as a second audio component) through the earbuds 10, 11. The user walks into their home and wishes to transfer the call to the smart speaker 20. How to do this, especially with the immersive call use case, is something addressed by example embodiments. In particular, there should be minimal discontinuities in the user's audio experience. Furthermore, example embodiments take into account that the user may remove the earbuds 10, 11 asynchronously, i.e., the user may remove first earbud 10 and keep the second earbud 11 in their ear.

Figure 3:
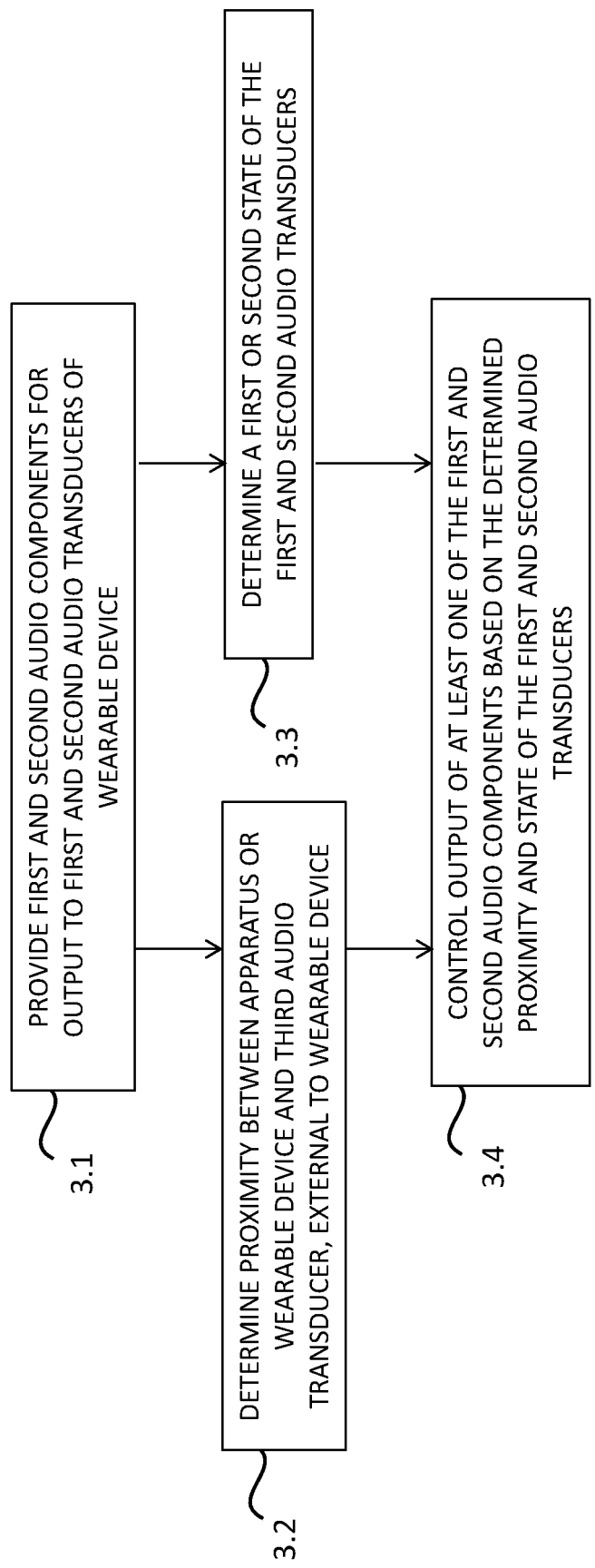
FIG. 3 is a flow diagram showing processing operations that may be performed in example embodiments, for example at the user apparatus of FIG. 1.

FIG. 3 is a flow diagram showing processing operations that may be provided according to example embodiments. The processing operations may be performed by hardware, software, firmware, or a combination thereof. In example, embodiments, the processing operations may be performed at the apparatus 13 but may be performed elsewhere.

A first operation 3.1 may comprise providing first and second audio components for output to first and second audio transducers 10a, 11a of a wearable device. Note that, in some examples, the first audio component may be provided to, and therefore associated with, the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, when an audio component, e.g. an object, is output so that it is perceived as panned to the front or back of the user, example embodiments may use a default operation of switching another audio component type, e.g. ambience sounds, to a third, external transducer.

A second operation 3.2 may comprise determining a proximity between the apparatus or wearable device (e.g. smartphone 13 and/or first earbud 10) and a third audio transducer (e.g. the third transducer 21) external to the wearable device.

A third operation 3.3 may comprise determining a state of the first and second audio transducers 10a, 11a, e.g. a first or second state. The second and third operations 3.2, 3.3 may be performed in any order and also simultaneously.

A fourth operation 3.4 may comprise controlling the output of at least one of the first and second audio components based on the determined proximity and state(s) determined in the second and third operations 3.2, 3.3.

Example, non-exhaustive, controlling operations may be configured as follows.

If in proximity to the third transducer 21 and both first and second audio transducers 10a, 11a are "off ear" then all audio components may be transferred to the third transducer.

If in proximity to the third transducer 21 and only one of the first and second audio transducers 10a, 11a, is "off ear" then one audio component may be transferred to the third transducer. The transferred audio component may be associated with the removed audio transducer 10a, 11a. For example, if the user is listing to a voice call and ambient sounds, then removing a particular audio transducer 10a, 11a, e.g. the one through which the audio object of the voice call is being output, may cause the voice call to transfer to the third transducer 21 whilst leaving the ambience playing through the on-ear other transducer. In this example, removal of the other transducer 10a, 11a whilst the initial transducer is on-ear may cause transfer of the ambient sounds to the third transducer 21 whilst leaving the voice call playing through the on-ear transducer. The user may therefore control how audio components are output both by their proximity and which audio transducer 10a, 11a is on and off-ear.

If not in proximity to the third transducer 21, removal of both first and second audio transducers 10a, 11a may cause ceasing of one or both audio components and/or termination of their respective applications or services. Taking the above example, the apparatus 13 may terminate the voice call and possibly terminate or pause the application or service responsible for the ambient sound.

If not in proximity to the third transducer 21, removal of only one of the first and second audio transducers 10a, 11a to an off-ear state may cause both components to be output using the in-ear state transducer. This may involve generating a monaural mix of, for example, the voice call and the ambient sound.

This control may involve switching or routing, as well as possibly some audio processing, which is performed in real-time or near real-time to make the process and perceived result as seamless and unobtrusive as possible.

FIGS. 4A-4E indicate some example visual scenarios which are not exhaustive.

Figure 4A:
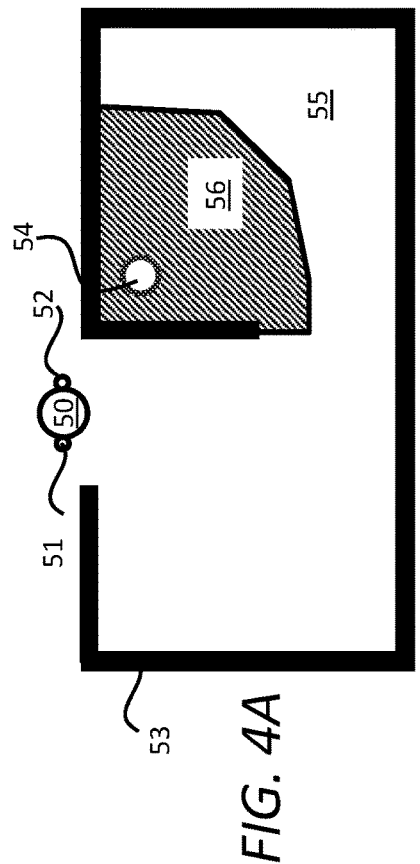
FIGS. 4A-4E are top plan views of a room within which a user of the user apparatus may move, to indicate potential scenarios in which the user apparatus of FIG. 1 may operate in accordance with some example embodiments.

Referring to FIG. 4A, a user 50 wearing a pair of earbuds 51, 52 enters their home, with reference numeral 53 indicating walls. A smart speaker 54 is shown located in one room 55 thereof in which the shaded area 56 represents an in-proximity zone, e.g. where a microphone of one of said earbuds 51, 52 can detect a test tone issued by the smart speaker 54. Both earbuds 51, 52 are in the on-ear state.

Figure 4B:
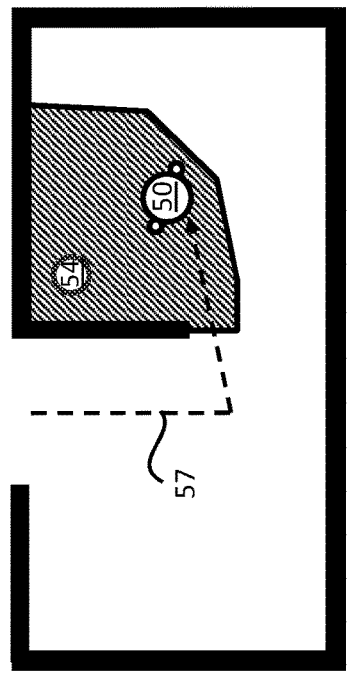

Referring to FIG. 4B, the user 50 travels via a route 57 to be in proximity to the smart speaker 54. Upon crossing a threshold into the in-proximity zone 56 (the shaded area), a notification sound may be output via one or both of the earbuds 51, 52 and/or the smart speaker 54. Additionally or alternatively, a vibration may be effected at one or both earbuds 51, 52 and/or the apparatus (not shown) e.g. the smartphone. A notification may be useful to indicate to the user 50 that they have the option of effecting control in the manner described herein. A notification is not however necessary.

Figure 4C:
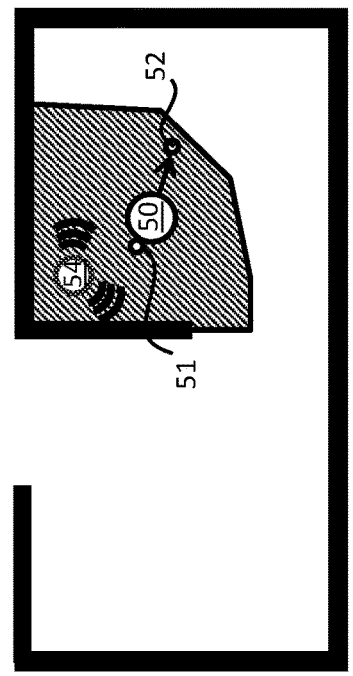

Referring to FIG. 4C, the user 50 may remove one of the earbuds 52 within the zone 56. This may cause control such that the output of one of said audio components is switched to the smart speaker 54 whilst an existing audio component is played through the on-ear earbud 51. As mentioned above, if the off-ear earbud 52 is associated with a voice call, that voice call will be switched or routed to the smart speaker 54 whilst ambient sounds remain in the on-ear earbud 51. The fact that the transferred audio component relates to a call may cause enablement of a microphone of the smart speaker 54. Likewise, although not shown, if the opposite situation occurs whereby the user 50 removes the other earbud 51 and leaves the initial earbud 52 on-ear, then the audio component associated with the other earbud will transfer to the smart speaker 54, e.g. the ambient sounds.

Figure 4D:
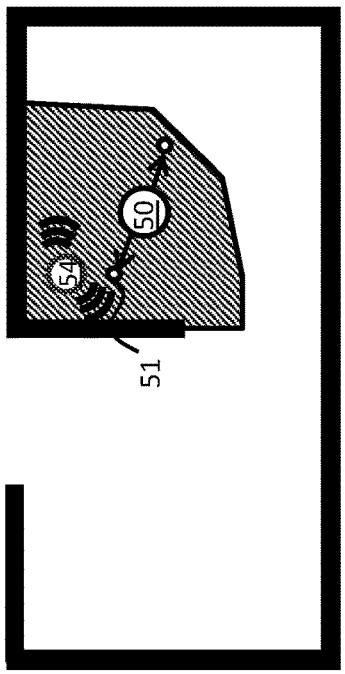

Referring to FIG. 4D, the user 50 may remove both earbuds 51, 52 within the zone 56. This may cause control such that both audio components are transferred to the smart speaker 54.

Figure 4E:
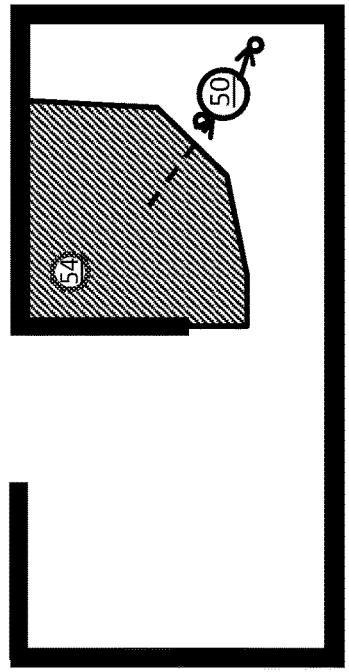

Referring to FIG. 4E, which may follow-on from the scenario in FIG. 4C, the user 50 having one earbud 52 off-ear and one earbud 51 on-ear may transition from within the zone 56 to a position outside of said zone. In this case, the control may be such as to issue a notification to the on-ear earbud 51 to indicate that not all audio components can be heard (which may enable the user to re-enter the zone 56 or perform some other control). For example, detection of a particular gesture or control input by the user 50 in this situation may cause output of all audio components using the on-ear earbud 51.

Some of the above scenarios according to example embodiments are supported by processing operations indicated in FIGS. 5-8, which may be performed by hardware, software, firmware, or a combination thereof. In example, embodiments, the processing operations may be performed at the apparatus 13 but may be performed elsewhere.

Figure 5:
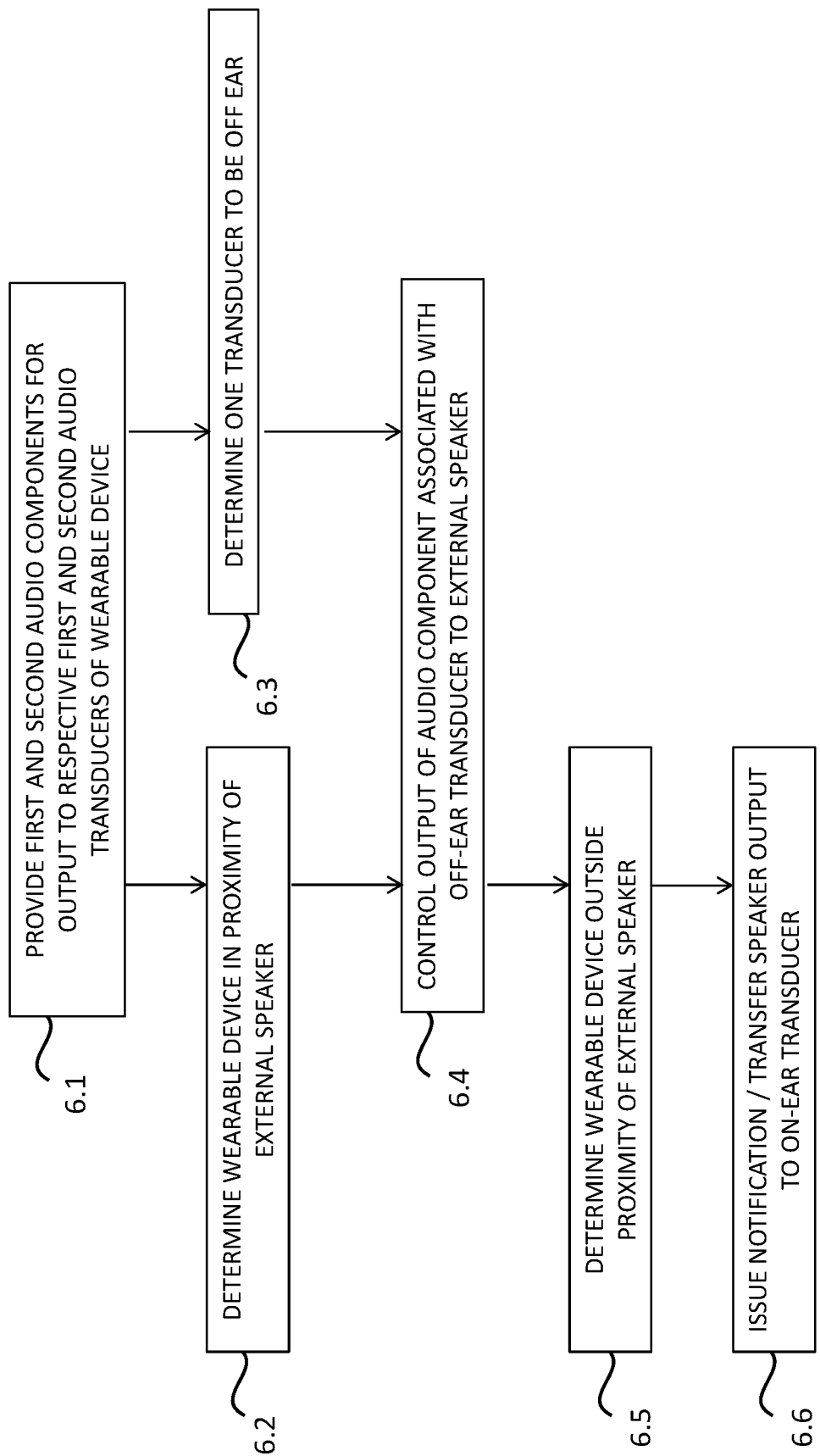
FIG. 5 is a flow diagram showing more specific processing operations that may be performed in some example embodiments.

Referring to FIG. 5, a first operation 6.1 may comprise providing first and second audio components for output to first and second audio transducers 10a, 11a of a wearable device. Note that, in some examples, the first audio component may be provided to the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, an audio object component may be panned to a particular direction by playing it using both the first and second audio transducers 10a, 11a, with the direction being controlled and changed using the relative audio levels for the transducers. If the level is higher for the first transducer 10a than the second transducer 11a, then it will be perceived closer to the first transducer, and vice versa. An ambient audio component may be played by both the first and second transducers 10a, 11a at the same level so it has no apparent direction. For example, some frequencies of the first audio component may be provided to the first transducer and other frequencies to the second transducer.

A second operation 6.2 may comprise determining that the apparatus or wearable device (e.g. smartphone 13 and/or first earbud 10) is proximate to the third audio transducer (e.g. the third transducer 21) external to the wearable device.

A third operation 6.3 may comprise determining the state of one of the first and second audio transducers 10a, 11a to be off-ear. The second and third operations 6.2, 6.3 may be performed in any order and also simultaneously.

A fourth operation 6.4 may comprise controlling the output of the audio component associated with the off-ear audio transducer to be transferred to an external speaker (e.g. the above-mentioned smart speaker 54 with third transducer).

A fifth, optional, operation 6.5 may comprise determining that the wearable device is now no longer proximate to the external speaker. A sixth operation 6.6 may comprise one or both of issuing a notification to the on-ear transducer and transferring the external speaker output to the on-ear audio transducer.

Referring to FIG. 6, a first operation 7.1 may comprise providing first and second audio components for output to first and second audio transducers 10a, 11a of a wearable device. Note that, in some examples, the first audio component may be provided to the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, an audio object component may be panned to a particular direction by playing it using both the first and second audio transducers 10a, 11a, with the direction being controlled and changed using the relative audio levels for the transducers.

A second operation 7.2 may comprise determining that the apparatus or wearable device (e.g. smartphone 13 and/or first earbud 10) is proximate to the third audio transducer (e.g. the third transducer 21) external to the wearable device.

A third operation 7.3 may comprise determining the state of both first and second audio transducers 10a, 11a to be off-ear. The second and third operations 7.2, 7.3 may be performed in any order and also simultaneously.

A fourth operation 7.4 may comprise controlling the output of all audio components to be transferred to an external speaker (e.g. the above-mentioned smart speaker 54 with third transducer).

Referring to FIG. 7, a first operation 8.1 may comprise providing first and second audio components for output to first and second audio transducers 10a, 11a of a wearable device. Note that, in some examples, the first audio component may be provided to the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, an audio object component may be panned to a particular direction by playing it using both the first and second audio transducers 10a, 11a, with the direction being controlled and changed using the relative audio levels for the transducers.

A second operation 8.2 may comprise determining that the apparatus or wearable device (e.g. smartphone 13 and/or first earbud 10) is not proximate to the third audio transducer (e.g. the third transducer 21) external to the wearable device.

A third operation 8.3 may comprise determining the state of both of the first and second audio transducers 10a, 11a to be off-ear. The second and third operations 8.2, 8.3 may be performed in any order and also simultaneously.

A fourth operation 8.4 may comprise controlling the output of one or all audio components or their associated application, service or function, to cease.

Referring to FIG. 8, a first operation 9.1 may comprise providing first and second audio components for output to first and second audio transducers 10a, 11a of a wearable device. Note that, in some examples, the first audio component may be provided to the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, an audio object component may be panned to a particular direction by playing it using both the first and second audio transducers 10a, 11a, with the direction being controlled and changed using the relative audio levels for the transducers.

A second operation 9.2 may comprise determining that the apparatus or wearable device (e.g. smartphone 13 and/or first earbud 10) is not proximate to the third audio transducer (e.g. the third transducer 21) external to the wearable device.

A third operation 9.3 may comprise determining the state of one of the first and second audio transducers 10a, 11a to be off-ear. The second and third operations 9.2, 9.3 may be performed in any order and also simultaneously.

A fourth operation 9.4 may comprise controlling the output of the audio component associated with the off-ear audio transducer to be transferred to the on-ear transducer, possibly as a monaural mix.

FURTHER EXAMPLE SCENARIOS

A plurality of applications, having associated sound objects, may be associated to a virtualised sound space, e.g. a first application is associated with a left-hand earbud, and second and third applications are associated with a right-hand earbud, at least initially. For example, a streaming music application may have its output routed to a left-hand earbud, whereas a communications application may have its output routed to a right-hand earbud whilst notifications from a messaging application also go to the right-hand earbud. If the user removes the right-hand earbud, sound for the communication application and the messaging notifications are transferred to the smart speaker. In some embodiments, the smart speaker may be configured to support stereo or even spatial audio output through the use of multiple third transducers. In this case, the audio that would be panned or positioned in the right-hand earbud may be similarly panned or positioned at the smart speaker.

In another example, a user may be involved in an immersive voice call when returning to their home. The user may wish to hear a local conversation that is taking place in their home. The user may choose to remove the earbud associated with one or more other audio components (e.g. ambience) to allow the local conversation to be heard, whilst also remaining involved in the voice call through the on-ear earbud. Were the ambience audio to be transferred to the on-ear earbud, then the voice call becomes less intelligible because the spatial relationship between the voice and ambience objects is removed. However, if the ambience is transferred to the smart speaker, as in example embodiments, then the ambience is audible to the user and also indicates to other people in the vicinity that a conversation is ongoing. The user may also move towards or away from the smart speaker to achieve the desired balance of ambience and voice object.

In another example, consider a user involved in an immersive voice call where part of the call uses a controlled or private channel and another part of the call uses a public channel, the channels being respective audio components. The user may enter a room with co-workers and may share the public channel part of the call by removing the earbud associated with the public channel, which channel then transfers to a smart speaker or conference speaker in the room, whereas the private channel remains at the on-ear earbud.

For an IVAS codec, one relevant use case mentioned in relevant documentation is where a first user is calling a second user and the call is forwarded to a third user who is able to communicate with the second user. Each part of the communication setup is a respective audio component. Thus, using example embodiments, the second user is in a position to share one part of the call (first user to second user part) with the third user while keeping the other part (third to second user) private.

In another example embodiment, consider a user involved in a voice call when returning to their home. The user has the option of transferring the call to an external speaker, of which there may be more than one, e.g. a smart speaker, a smart TV, a games console etc. The user may choose to remove an earbud to cause one or more audio components other than the voice call to initially be output to the available one or more external speakers. The external speakers may all be determined as proximate or just one may initially be proximate to enable the user to navigate around their home to ascertain which other speakers are available. This may therefore signal which external speaker or speakers the user may subsequently transfer the call to, noting that some external speakers may be more suitable for voice calls and/or have better interfaces. Transfer of the actual voice call to a selected external speaker may be by way of removing the remaining on-ear earbud nearest the selected external speaker, and/or by gesture control using the remaining earbud. For example, the user may remove the remaining earbud and wave it in the direction of the smart TV, whereby sensors of said earbud are used in gesture-detection by the apparatus to ascertain which of the available external speakers are to be used for the voice call.

In another example embodiment, consider a user hearing a rich 360 degree sound scene through first and second earbuds. The audio components may comprise, for example, a voice call, streaming music and notifications from one or more applications. The user may, by turning their head with the earbuds on-ear, select which audio component they wish to share with a larger audience by means of the external speaker or speakers and which audio component they wish to keep private via the earbud. For example, the user may transfer via head motions that the notifications should be moved from the current earbud to the other earbud currently handling a voice call. Then, by removing that other earbud, the voice call and notifications may be transferred to the smart speaker whilst the streaming music remains playing via the on-ear earbud.

In another example embodiment, the type of transferred audio component may determine if the smart speaker's own microphone 23 (e.g. element of the smart speaker 20 in FIG. 2) is enabled or disabled. If a voice call is transferred to the smart speaker 20, then the microphone 23 may become enabled, for example.

In other example embodiments, where there are multiple external speakers to which the apparatus is paired, or may pair, a choice of which external speaker to transfer audio components to may be based on proximity. For example, if an earbud is taken off closer to a first external speaker than a second external speaker, the associated audio component may be transferred in accordance with example embodiments to that first external speaker. If the user were then to move closer to the second external speaker, and take the other earbud off-ear, then the remaining audio component or components may transfer to that second external speaker. A similar concept may be applied when earbuds are placed back on-ear. For example, if the user replaces an earbud when closer to the first external speaker, the audio component from the first external speaker may be transferred back to that replaced earbud, irrespective of the association of audio components and earbuds previously used.

As mentioned above, in some examples, the first audio component may be provided to, and therefore associated with, the first audio transducer 10a and the second audio component may be provided to the second audio transducer 11a. However, in other embodiments, one or both of the first and/or second audio components, or some contribution thereof, may be provided to both audio transducers 10a, 11a, e.g. as for ambient audio or spatial audio. For example, when an audio object is output so that it is perceived as panned to the front or back of the user, example embodiments may use a default operation of what audio component or components to initially switch to the external speaker. For example, ambient sounds may be switched first regardless of which earbud is removed. Alternatively, user preferences associated with an application provided on the apparatus may enable a user to determine which audio components or component types to switch in what order or under which conditions.

In some example embodiments, there may be provided more than one proximity zone or audibility threshold, representing a respective high and low audibility level between the earbuds and the external speaker. In this setup, one control method may be to transfer output to the external speaker if the audibility is above the high level audibility threshold and to transfer it to the remaining on-ear earbud if it is above the low level audibility threshold.

Example Apparatus

FIG. 9 shows an apparatus according to an embodiment, which may comprise the apparatus 13 as described herein, or components thereof may be comprised in the earbuds or external speaker. The apparatus may be configured to perform the operations described herein, for example operations described with reference to any preceding process. The apparatus comprises at least one processor 100 and at least one memory 101 directly or closely connected to the processor. The memory 101 includes at least one random access memory (RAM) 101*a* and at least one read-only memory (ROM) 101*b*. Computer program code (software) 105 is stored in the ROM 101*b*. The apparatus may be connected to a transmitter (TX) and a receiver (RX). The apparatus may, optionally, be connected with a user interface (UI) for instructing the apparatus and/or for outputting data. The at least one processor 100, with the at least one memory 101 and the computer program code 105 are arranged to cause the apparatus to at least perform at least the method according to any preceding process.

FIG. 10 shows a non-transitory media 110 according to some embodiments. The non-transitory media 110 is a computer readable storage medium. It may be e.g. a CD, a DVD, a USB stick, a blue ray disk, etc. The non-transitory media 110 stores computer program code, causing an apparatus to perform the method of any preceding process.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory including computer program code,
the at least one memory and the computer program code configured to, with the at least one processor, cause the apparatus to perform at least the following:
provide a first and a second audio components for output to first and second audio transducers of a wearable device;
determine a proximity between the apparatus or the wearable device and a third audio transducer external to the wearable device;
determine a first or second state of the first and second audio transducers; and
control output of at least one of the first and second audio components based on the determined proximity and the state of the first and second audio transducers,
wherein, responsive to the apparatus or the wearable device being determined as proximate to the third audio transducer, and the state of one of said first and second audio transducers being in the second state whilst the other of said first and second audio transducers is in the first state, the apparatus being caused to control output by being configured to cause output of the audio component associated with the audio transducer in the second state to be transferred to the third audio transducer whilst continuing to output the audio component associated with the audio transducer in the first state to said audio transducer in the first state.

2. The apparatus of claim 1, wherein the first and second audio transducers respectively comprise first and second earphones and wherein the apparatus is caused to determine the first or second state of said first and second audio transducers by being configured to determine either an on-ear state as the first state or an off-ear state as the second state for the first and second earphones.

3. The apparatus of claim 1, wherein the apparatus is caused to determine the first or second state of said first and second audio transducers by being configured to determine a respective battery charge level associated with each of the first and second audio transducers, wherein a battery charge level at or above a predetermined threshold corresponds to the first state and a battery charge level below the predetermined threshold corresponds to the second state.

4. The apparatus of claim 1, wherein, responsive to the determined proximity of the apparatus or the wearable device crossing a proximity threshold value from being proximate to the third audio transducer to not being proximate, the apparatus is further configured to issue an audible notification to the audio transducer in the first state.

5. The apparatus of claim 4, further caused to, subsequent to issuing the audible notification, receive a user input or gesture for enabling output of the audio component that was being output to the third audio transducer to be transferred to the audio transducer in the first state.

6. The apparatus of claim 1, further caused to; determine that the third audio transducer supports stereo or spatial audio output, and wherein, if a third audio component is provided to the second state audio transducer for output with the respective first or second audio component in a spatialized form, the apparatus is caused to control output by being configured to transfer said spatialized audio components for stereo or spatial output at the third audio transducer.

7. The apparatus of claim 1, further caused to:
determine that the apparatus or the wearable device is proximate to a fourth audio transducer, different from the third audio transducer and external to the wearable device, and that the audio transducer in the first state has changed to the second state; and
responsive to said determination, the apparatus is caused to control output by being configured to cause output of the audio component associated with the audio transducer in the second state to be transferred to said fourth audio transducer.

8. The apparatus of claim 1, wherein, responsive to the apparatus or the wearable device being determined as proximate to the third audio transducer, and both of said first and second audio transducers being in the second state, the apparatus is caused to control output by being configured to cause output of both the first and second audio components to be transferred to the third audio transducer.

9. The apparatus of claim 1, wherein, responsive to the apparatus or the wearable device being determined as not being proximate to the third audio transducer, and the state of one of said first and second audio transducers is in the second state whilst the other of said first and second audio transducers is in the first state, the apparatus is caused to control output by being configured to cause the audio component associated with the audio transducer in the second state to be transferred to the other, audio transducer in the first state with the current output of said audio transducer in the first state.

10. The apparatus of claim 9, wherein the apparatus is caused to control output by being further configured to generate a monaural mix of the first and second audio components for output to said audio transducer in the first state.

11. The apparatus of claim 1, wherein one of the audio components corresponds to a voice call or communications session.

12. The apparatus of claim 11, wherein, responsive to the apparatus or the wearable device being determined as not proximate to the third audio transducer, and the state of both of said first and second audio transducers being in the second state, the apparatus is caused to control output by being configured to terminate the voice call or communications session.

13. The apparatus of claim 1, wherein the apparatus is caused to determine the proximity of the apparatus or the wearable device to the third audio transducer by being configured to determine receipt of an audible test signal issued by the third audio transducer using a microphone associated with the wearable device.

14. The apparatus of claim 1, being a mobile telecommunications apparatus.

15. A method, comprising:
providing a first and a second audio components for output to respective first and second audio transducers of a wearable device;
determining a proximity between an apparatus or the wearable device and a third audio transducer external to the wearable device;
determining a first or second state of the first and second audio transducers; and
controlling output of at least one of the first and second audio components based on the determined proximity and the state of the first and second audio transducers, wherein, responsive to the apparatus or the wearable device being determined as proximate to the third audio transducer, and the state of one of said first and second audio transducers being in the second state whilst the other of said first and second audio transducers is in the first state, causing output of the audio component associated with the audio transducer in the second state to be transferred to the third audio transducer whilst continuing to output the audio component associated with the audio transducer in the first state to said audio transducer in the first state.

16. The method of claim 15, wherein the first and second audio transducers respectively comprise first and second earphones and wherein determining the first or second state of said first and second audio transducers is configured to determine either an on-ear state as the first state or an off-ear state as the second state for the first and second earphones.

17. The method of claim 15, wherein the determining the first or second state of said first and second audio transducers is configured to determine a respective battery charge level associated with each of the first and second audio transducers, wherein a battery charge level at or above a predetermined threshold corresponds to the first state and a battery charge level below the predetermined threshold corresponds to the second state.

18. The method of claim 15, wherein, responsive to the determined proximity of the apparatus or the wearable device crossing a proximity threshold value from being proximate to the third audio transducer to not being proximate, the method further comprising issuing an audible notification to the audio transducer in the first state.

19. The method of claim 18, further comprising, subsequent to issuing the audible notification, receiving a user input or gesture for enabling output of the audio component that was being output to the third audio transducer to be transferred to the audio transducer in the first state.

20. A non-transitory computer readable medium comprising program instructions stored thereon for performing at least the following:
providing a first and a second audio components for output to respective first and second audio transducers of a wearable device;
determining a proximity between an apparatus or the wearable device and a third audio transducer external to the wearable device;
determining a first or second state of the first and second audio transducers; and
controlling output of at least one of the first and second audio components based on the determined proximity and the state of the first and second audio transducers, wherein, responsive to the apparatus or the wearable device being determined as proximate to the third audio transducer, and the state of one of said first and second audio transducers being in the second state whilst the other of said first and second audio transducers is in the first state, causing output of the audio component associated with the audio transducer in the second state to be transferred to the third audio transducer whilst continuing to output the audio component associated with the audio transducer in the first state to said audio transducer in the first state.

\* \* \* \* \*

UNITED STATES PATENT AND TRADEMARK OFFICE
CERTIFICATE OF CORRECTION

| | |
|---|---|
| PATENT NO. | : 11,665,271 B2 |
| APPLICATION NO. | : 17/196099 |
| DATED | : May 30, 2023 |
| INVENTOR(S) | : Jussi Artturi Leppänen et al. |

It is certified that error appears in the above-identified patent and that said Letters Patent is hereby corrected as shown below:

In the Claims

In Column 17, Line 3, Claim 6, delete "caused to;" and insert -- caused to --, therefor.

Signed and Sealed this
Nineteenth Day of September, 2023

Katherine Kelly Vidal
*Director of the United States Patent and Trademark Office*